United States Patent
Das et al.

(10) Patent No.: US 7,437,654 B2
(45) Date of Patent: Oct. 14, 2008

(54) SUB-PACKET ADAPTATION IN A WIRELESS COMMUNICATION SYSTEM

(75) Inventors: Arnab Das, Old Bridge, NJ (US); Farooq Ullah Khan, Manalapan, NJ (US); Sanjiv Nanda, Clarksburg, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 380 days.

(21) Appl. No.: 09/725,393

(22) Filed: Nov. 29, 2000

(65) Prior Publication Data

US 2002/0103953 A1 Aug. 1, 2002

(51) Int. Cl.
*H03M 13/00* (2006.01)
*H04B 7/216* (2006.01)

(52) U.S. Cl. .......... 714/790; 370/342; 370/474

(58) Field of Classification Search ......... 370/349, 370/474, 342; 375/225–228; 714/790
See application file for complete search history.

(56) References Cited

U.S. PATENT DOCUMENTS

| | | | | |
|---|---|---|---|---|
| 3,696,203 A | * | 10/1972 | Leonard | 375/232 |
| 4,504,944 A | * | 3/1985 | Johannes | 370/540 |
| 4,774,496 A | * | 9/1988 | Tomasevich | 341/50 |
| 4,789,983 A | * | 12/1988 | Acampora et al. | 370/349 |
| 4,894,823 A | * | 1/1990 | Adelmann et al. | 370/252 |
| 5,337,313 A | * | 8/1994 | Buchholz et al. | 370/394 |
| 5,396,518 A | * | 3/1995 | How | 375/265 |
| 5,459,720 A | * | 10/1995 | Iliev et al. | 370/393 |
| 5,490,168 A | | 2/1996 | Phillips et al. | 375/224 |
| 5,517,500 A | * | 5/1996 | White et al. | 370/392 |
| 5,517,502 A | * | 5/1996 | Bestler et al. | 370/449 |
| 5,574,979 A | * | 11/1996 | West | 455/63.1 |
| 5,629,934 A | * | 5/1997 | Ghosh et al. | 370/335 |
| 5,682,379 A | * | 10/1997 | Mahany et al. | 370/311 |
| 5,691,992 A | * | 11/1997 | Molnar et al. | 714/752 |
| 5,822,318 A | * | 10/1998 | Tiedemann et al. | 370/391 |
| 5,828,677 A | * | 10/1998 | Sayeed et al. | 714/774 |
| 5,886,989 A | * | 3/1999 | Evans et al. | 370/347 |
| 5,914,933 A | * | 6/1999 | Cimini et al. | 370/208 |
| 5,914,950 A | * | 6/1999 | Tiedemann et al. | 370/348 |
| 5,983,383 A | * | 11/1999 | Wolf | 714/755 |
| 6,005,855 A | * | 12/1999 | Zehavi et al. | 370/335 |
| 6,014,694 A | * | 1/2000 | Aharoni et al. | 709/219 |

(Continued)

FOREIGN PATENT DOCUMENTS

EP 281306 A2 * 9/1988

(Continued)

OTHER PUBLICATIONS

Dictionary of Computers, Information Processing & Telecommunications, second edition pp. 86, 100, 447.*

(Continued)

*Primary Examiner*—Paul R Myers

(57) ABSTRACT

Disclosed is a method of sub-packet adaptation based on data rate. Specifically, the size of a sub-packet is adapted to a data rate at which the sub-packet is to be transmitted. In one embodiment, the sub-packet is size adapted to the data rate in a format that would allow such size adapted sub-packet to be soft combined with another sub-packet of a same or different size. The size adapted sub-packet may be transmitted prior to or after the other sub-packet.

18 Claims, 2 Drawing Sheets

U.S. PATENT DOCUMENTS

| | | | | |
|---|---|---|---|---|
| 6,031,831 | A * | 2/2000 | Tan Boon et al. | 370/342 |
| 6,067,458 | A * | 5/2000 | Chen | 455/522 |
| 6,088,385 | A * | 7/2000 | Liu | 375/219 |
| 6,101,626 | A * | 8/2000 | Morelos-Zaragoza et al. | 714/786 |
| 6,111,912 | A * | 8/2000 | Cohen et al. | 375/225 |
| 6,131,180 | A * | 10/2000 | Ramesh | 714/790 |
| 6,272,123 | B1 * | 8/2001 | Abe | 370/342 |
| 6,289,486 | B1 * | 9/2001 | Lee et al. | 714/788 |
| 6,298,092 | B1 * | 10/2001 | Heath et al. | 375/267 |
| 6,341,125 | B1 * | 1/2002 | Hong et al. | 370/335 |
| 6,347,091 | B1 * | 2/2002 | Wallentin et al. | 370/437 |
| 6,359,877 | B1 * | 3/2002 | Rathonyi et al. | 370/349 |
| 6,366,589 | B1 * | 4/2002 | Naudus et al. | 370/468 |
| 6,378,101 | B1 * | 4/2002 | Sinha et al. | 714/755 |
| 6,397,367 | B1 * | 5/2002 | Park et al. | 714/786 |
| 6,563,821 | B1 * | 5/2003 | Hong et al. | 370/389 |
| 6,587,443 | B1 * | 7/2003 | Dutta | 370/322 |
| 6,671,851 | B1 * | 12/2003 | Moulsley | 714/790 |
| 6,675,347 | B1 * | 1/2004 | Razoumov et al. | 714/790 |
| 6,681,365 | B1 * | 1/2004 | Anand et al. | 714/790 |
| 6,694,469 | B1 * | 2/2004 | Jalali et al. | 714/748 |
| 6,819,718 | B1 * | 11/2004 | Koehn et al. | 375/242 |
| 2002/0009061 | A1 * | 1/2002 | Willenegger | 370/328 |
| 2002/0013135 | A1 * | 1/2002 | Proctor, Jr. | 455/228 |
| 2002/0051466 | A1 * | 5/2002 | Bruckman | 370/474 |
| 2002/0155852 | A1 * | 10/2002 | Bender | 455/522 |
| 2003/0037142 | A1 * | 2/2003 | Munger et al. | 709/225 |
| 2003/0051165 | A1 * | 3/2003 | Krishnan et al. | 713/201 |
| 2003/0063583 | A1 * | 4/2003 | Padovani et al. | 370/329 |

FOREIGN PATENT DOCUMENTS

| | | |
|---|---|---|
| EP | 853403 A2 * | 7/1998 |
| EP | 0 892 579 A1 | 1/1999 |
| EP | 0 938 207 A | 8/1999 |
| EP | 998069 A2 * | 5/2000 |
| WO | WO 99/12303 | 3/1999 |
| WO | 00/49760 | 8/2000 |
| WO | WO 00/49760 | 8/2000 |

OTHER PUBLICATIONS

Punctured Convolutional Codes of Rate (n-1)/n and Simplified Maximum Likelihood Decoding by Cain et al pp. 97-100, IEEE Transactions on Information Technology, vol. it-25, No. 1 Jan. 1979.*

Eriksson et al: "Comparison of Link Quality Control Strategies for Packet Data Services in EDGE" Vehicular Technology Conference, 1999 IEEE 49$^{TH}$ Houston, TX, USA May 16-20, 1999, Piscataway, NJ, USA, IEEE, US, May 16, 1999, pp. 938-942, XP010342128, ISBN: 0-7803-5565-2, Section II.

Balachandran, K. et al: "GPRS-136: High-Rate Packet Data Service for North American TDMA Digital Cellular Systems" IEEE Personal Communications, IEEE Communications Society, US, vol. 6, No. 3, Jun. 1999, pp. 34-47, XP000831519, ISSN: 1070-9916, p. 41, section "Adaptive Modulation".

Bakhtiyari S., et al: "Practical Implementation of a Mobile Data Link Protocol with a Type II Hybrid Arq Scheme and Code Combining", Personal Communication—Freedom Through Wireless Technology, Secaucus, NJ, May 18-20, 1993, Proceedings of the Vehicular Technology Conference, New York, IEEE, US, pp. 774-777, XP000393297, ISBN: 0-7803-1267-8, p. 774-p. 775.

European Search Report dated May 17, 2002.

European Search Report dated Jan. 21, 2002.

Krishna Balachandran, et al, "GPRS-136: High-Rate Packet Data Service for North American TDMA Digital Cellular Systems", *IEEE Communications Society, US*, vol. 6, No. 3, (Jun. 1999), pp. 34-47.

S. Bakhtiyari, et al, "Practical Implementation of a Mobile Data Link Protocol With a Type II Hybrid ARQ Scheme and Code Combining", *Proceedings of the Vehicular Technology Conference, NY, IEEE, US*, Conf. 43, (May 18, 1993), pp. 774-777.

European Search Report.

* cited by examiner

SUB-PACKET ADAPTATION IN A WIRELESS COMMUNICATION SYSTEM

CROSS REFERENCE TO RELATED APPLICATION

Related subject matter is disclosed in the following application being filed concurrently herewith: U.S. patent application entitled "Rate Adaptation In A Wireless Communication System", Ser. No. 09/725,438.

FIELD OF THE INVENTION

The present invention relates generally to wireless communication systems and, in particular, to data transmission over wireless communication systems.

BACKGROUND OF THE RELATED ART

In the well-known Data Only Evolution of third generation CDMA based wireless communication systems, hereinafter referred to as 3G-1x EVDO, voice and data services are provided using separate frequency carriers. That is, the voice and data signals are transmitted over separate forward links defined by different frequency carriers. Data is transmitted over a time multiplexed frequency carrier at fixed data transmit powers but at variable data rates. Specifically, measured SIR at a receiver of a pilot signal transmitted by a base station is used to determine a data rate which can be supported by the receiver. Typically, the determined data rate corresponds to a maximum data rate at which a minimum level of quality of service can be achieved at the receiver. Higher measured SIR translates into higher data rates, wherein higher data rates involve higher order modulation and weaker coding than lower data rates. For example, if measured SIR at the receiver is 12 dB and −2dB at two different receivers, then the data rates may be 2.4 Mb/s and 38.4 Kb/s at each of the respective receivers.

To improve system throughput, 3G-1x EVDO allows the receiver with the most favorable channel conditions, i.e., highest measured SIR, and thereby the highest associated data rate, to transmit ahead of receivers with comparatively less favorable channel conditions. 3G-1x EVDO utilizes a fast rate adaptation mechanism whereby the receiver, for every time slot, measures SIR, calculates a data rate using the measured SIR and reports the calculated data rate to the base station. Calculated data rates from multiple receivers are used by the base station to schedule when data transmission is to occur for a particular receiver.

Data transmission from the base station to a particular receiver occurs when that receiver reports the highest calculated data rate to the base station. The following protocol is utilized in data transmissions. The base station transmits data to the receiver in time slot n at the calculated data rate. The receiver receives the data transmission and responds with an ACK/NACK message indicating to the base station whether the data transmission was successfully received, i.e., no errors, by the receiver. Specifically, if the data transmission is successfully received, the receiver responds with an acknowledgement or ACK. Otherwise the receiver responds with a negative acknowledgement or NACK. The ACK/NACK message is received by base station in time slot n+j, wherein j is some known time offset. Thus, the base station can determine that an ACK/NACK message was transmitted from a receiver to which data was transmitted j time slots prior to receipt of the ACK/NACK message.

If an ACK was received, the base station knows that the data transmission to the associated receiver was successful. If a NACK was, the base station knows that the data transmission to the associated receiver was unsuccessful. In response to the NACK, the base station re-transmits, at the same data rate, the same data which was earlier transmitted. Note that the term "re-transmits the same data" should be understood to describe a retransmission of the data that may or may not be identical to the data it is being compared to, i.e., data transmitted in a previous transmission, so long as the data of the retransmission may be soft combined with the data to which it is being compared. The re-transmitted data is received by the receiver in time slot n+j+k, wherein k is some known time offset.

This prior art protocol disadvantageously utilizes a same sub-packet size in the initial transmission and in the re-transmissions regardless of the data rate. Specifically, at low data rates, it is undesirable to transmit large sub-packets because it hinders scheduling flexibility and requires more time slots. By contrast, at high data rates, it is undesirable to transmit small sub-packets because it utilizes channel resources inefficiently.

SUMMARY OF THE PRESENT INVENTION

The present invention is a method of sub-packet adaptation based on data rate. In the present invention, the size of a sub-packet is adapted to a data rate at which the sub-packet is to be transmitted. The present invention adapts the sub-packet size to the data rate in a format that would allow such size adapted sub-packet to be soft combined with another sub-packet of a same or different size. The size adapted sub-packet may be transmitted prior to or after the other sub-packet. In one embodiment, the present invention comprises the steps of channel coding an encoder packet to produce a channel coded encoder packet; and puncturing and/or repeating the channel coded encoder packet to produce an encoder sub-packet having a size based on a size of the encoder packet and a data transmission rate at which the encoder sub-packet is to be transmitted.

BRIEF DESCRIPTION OF THE DRAWINGS

The features, aspects, and advantages of the present invention will become better understood with regard to the following description, appended claims, and accompanying drawings where:

DETAILED DESCRIPTION

Figure 1:
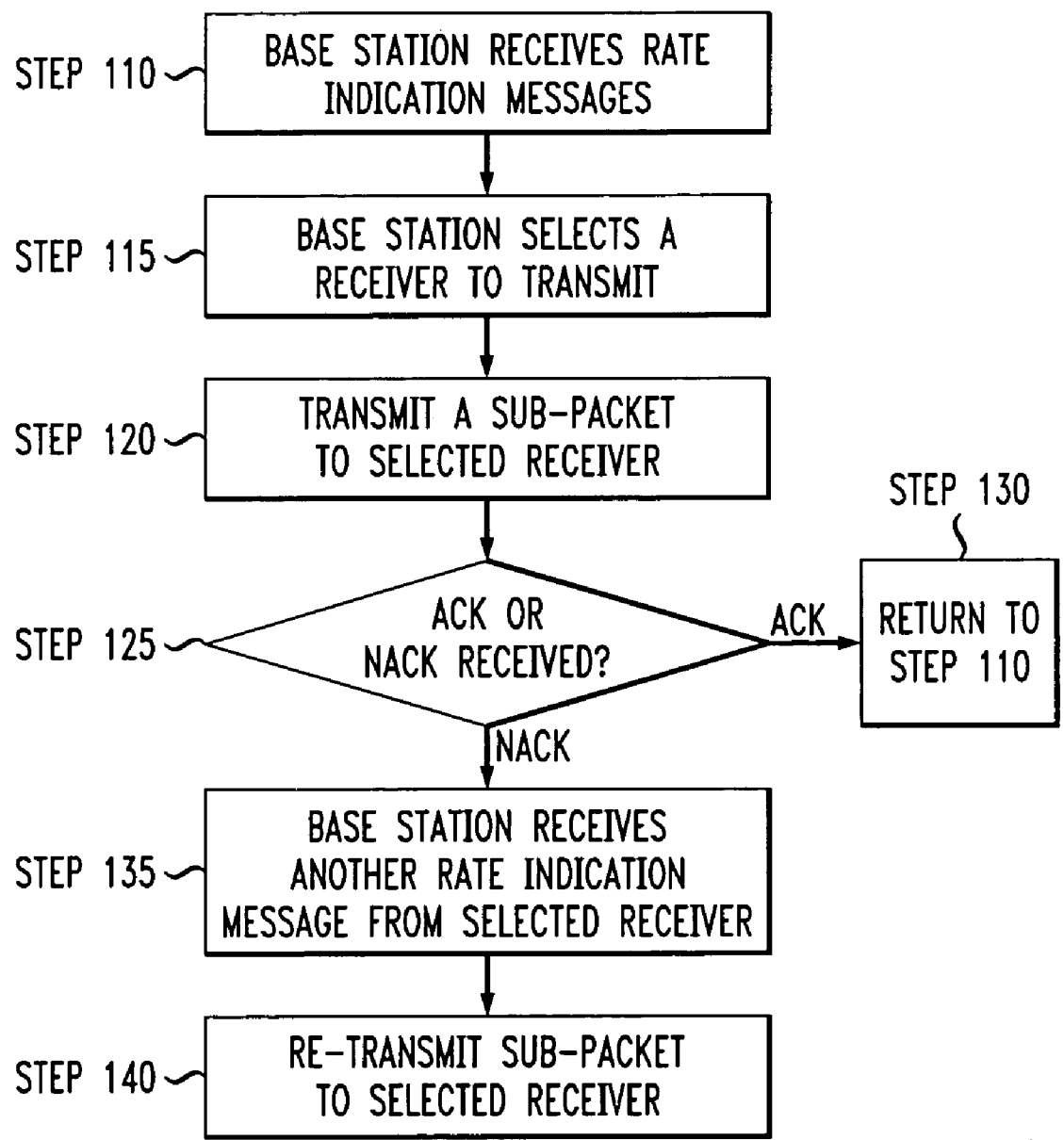
FIG. 1 depicts a flowchart illustrating the data rate adaptation technique in accordance with one embodiment of the present invention.

The present invention is a method of data rate adaptation based on channel conditions. FIG. 1 depicts a flowchart 100 illustrating the data rate adaptation technique in accordance with one embodiment of the present invention. In step 110, a base station or transmitting equipment receives rate indication messages from a plurality of receivers to which data transmissions are intended, wherein a rate indication message may be a channel condition measurement at a receiver or a data rate calculated based on a channel condition measurement at a receiver. In step 115, the base station selects a receiver at which to transmit data, wherein the selected receiver preferably is associated with the highest data rate. In step 120, the base station transmits a sub-packet of data to the selected receiver at the data rate indicated by the associated rate indication message.

In another embodiment, the sub-packet transmitted in step 120 may be transmitted at a data rate higher than the data rate indicated in the rate indication message. The reason for doing this is to decrease the amount of time slots over which the sub-packets are to be transmitted in step 120. Although the transmission quality may degrade because of the increased data rate, Hybrid ARQ may be used to soft combine the sub-packets transmitted in step 140 with the sub-packets transmitted in step 120. Under certain conditions, e.g. at lower data rates, when using Hybrid ARQ (soft combining) throughput efficiency of the channel can be improved through the "aggressive" use of the channel, i.e., transmitting at higher data rates than indicated by the receiver.

The data rate at which the encoder sub-packets are transmitted may be negotiated between the base station and receiver anytime prior to the actual transmission of the encoder sub-packets. For example, the receiver transmits a rate indication message to the base station indicating a data rate of 19.2 Kb/s. The base station wants to be aggressive with the data transmission by using a data rate of 76.8 Kb/s to transmit an encoder sub-packet to the receiver. Accordingly, the base station transmits a new rate message to the receiver indicating the new data rate at which the base station will be transmitting the encoder sub-packet to the receiver, wherein the new data rate indicated may or may not be the same as the data rate indicated in the data rate message. Upon receipt of the new rate message, the receiver would know the data rate to use in decoding the encoder sub-packet.

In an embodiment of the present invention, the new data rate is based on the data rate message and the size of the encoder packet. For larger size encoder packets, it is desirable to set the new data rate as a higher multiple, e.g., four times, of the data rate indicated in the data rate message in order to reduce the number of time slots utilized in the transmission and to promote scheduling flexibility. By contrast, for smaller size encoder packets, it is desirable to set the new data rate as a lower multiple, e.g., one times, of the data rate indicated in the data rate message in order to utilize the channel more efficiently.

Table I depicts an example lookup table which may be used in selecting a new data rate based on the data rate indicated by the receiver and the size of the encoder packet. For example, suppose the data rate message indicates a data rate of 38.4 Kb/s and the encoder packet is 1,536 bits. The new rate message would then indicate a new data rate of 153.6 Kb/s.

TABLE I

| Data Rate Indicated In Data Rate Message Kb/s | Data Rates For 7,680 Bit Encoder Packet Kb/s | Data Rates For 3,072 Bit Encoder Packet Kb/s | Data Rates For 1,536 Bit Encoder Packet Kb/s | Data Rates For 768 Bit Encoder Packet Kb/s |
|---|---|---|---|---|
| 9.6 | 38.4 | 38.4 | 38.4 | 38.4 |
| 19.2 | 76.8 | 76.8 | 76.8 | 76.8 |
| 38.4 | 153.6 | 153.6 | 153.6 | 153.6 |
| 76.8 | 307.2 | 307.2 | 307.2 | 307.2 |

TABLE I-continued

| Data Rate Indicated In Data Rate Message Kb/s | Data Rates For 7,680 Bit Encoder Packet Kb/s | Data Rates For 3,072 Bit Encoder Packet Kb/s | Data Rates For 1,536 Bit Encoder Packet Kb/s | Data Rates For 768 Bit Encoder Packet Kb/s |
|---|---|---|---|---|
| 153.6 | 614.4 | 614.4 | 614.4 | 614.4 |
| 307.6 | 877.7 | 819.2 | 614.4 | 614.4 |
| 614.4 | 1228.8 | 1228.8 | 1228.8 | 614.4 |
| 819.2 | 1536.0 | 1228.8 | 1228.8 | 614.4 |
| 1228.8 | 2048.0 | 2457.6 | 1228.8 | 614.4 |
| 1536.0 | 3072.0 | 2457.6 | 1228.8 | 614.4 |
| 2048.0 | 3072.0 | 2457.6 | 1228.8 | 614.4 |
| 2457.6 | 3072.0 | 2457.6 | 1228.8 | 614.4 |

In step 125, the base station receives an ACK/NACK message from the selected receiver. If the message is an ACK, in step 130, flowchart 100 returns to step 110. If the message is a NACK, in step 135, the base station receives from the selected receiver another rate indication message. Additionally, when a NACK is transmitted by the receiver, the receiver stores in memory the received data which was transmitted in step 120 such that it may later be soft combined with a re-transmission of the same data.

In step 140, the base station re-transmits the sub-packet of data to the selected receiver at the data rate indicated in the second rate indication message received in step 135. As in step 120, the sub-packet may be transmitted at a data rate higher than the data rate indicated in the second rate indication message.

In one embodiment, the sub-packet of data transmitted in steps 120 and 140 are of the same size but the number of time slots over which the sub-packets are transmitted or modulation scheme may vary if the data rates in steps 120 and 140 are different. In another embodiment, such sub-packet are of different sizes if Hybrid ARQ may be used to soft combine the sub-packets transmitted in steps 120 and 140.

In an alternate embodiment, regardless of whether the ACK/NACK message transmitted by the selected receiver is an ACK or a NACK, flowchart 100 returns to step 110 from step 125. In this embodiment, the re-transmission to the originally selected receiver would not occur until the selected receiver is the receiver with the highest associated data rate.

Figure 2:
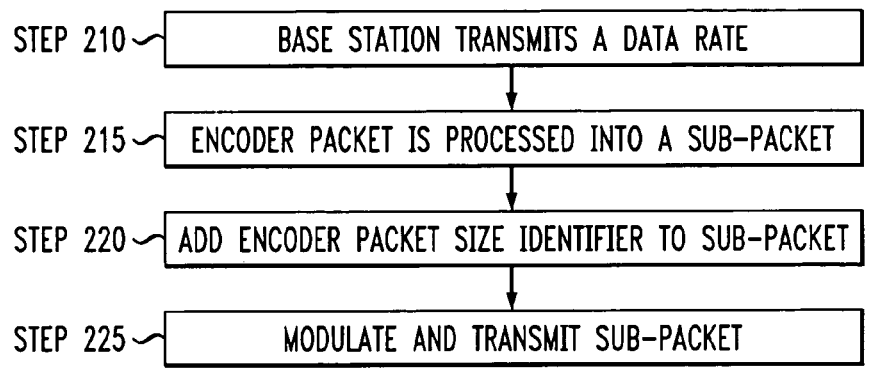
FIG. 2 depicts a flowchart illustrating a manner of varying the size of the sub-packets, the modulation scheme and number of time slots over which the sub-packets are transmitted in accordance with one embodiment of the present invention.

In a preferred embodiment, the manner in which sub-packets are transmitted in steps 120 and 140 allows for Hybrid ARQ at different data rates. This embodiment is achieved by varying the size of the sub-packets, the modulation scheme and number of time slots over which the sub-packets are transmitted. FIG. 2 depicts a flowchart 200 illustrating a manner of varying the size of the sub-packets, the modulation scheme and number of time slots over which the sub-packets are transmitted in accordance with one embodiment of the present invention. In step 210, at the connection set-up to a new receiver, or through other broadcast means, the base station indicates to the receiver the data transmission rate that will be used by the base station corresponding to a rate indication message from the receiver and each of the encoder packet sizes (as shown in Table 1). Alternatively, the base station transmits a new rate message to the selected receiver indicating the new data rate at which the base station intends to transmit data to the selected receiver. In another embodiment, the new rate message may be included in the header information of along with the encoder packet size indication. In step 215, an encoder packet is processed into a specific size encoder sub-packet, wherein the encoder packet is a block of information intended for the receiver and the encoder sub-packet is a representation of the encoder packet which is transmitted to the receiver. Specifically, the encoder packet is channel coded and subsequently punctured and/or repeated to obtain a sub-packet. The size of the sub-packet being dependent on the data rate at which the sub-packet is to be transmitted and the size of the encoder packet.

Figure 3:
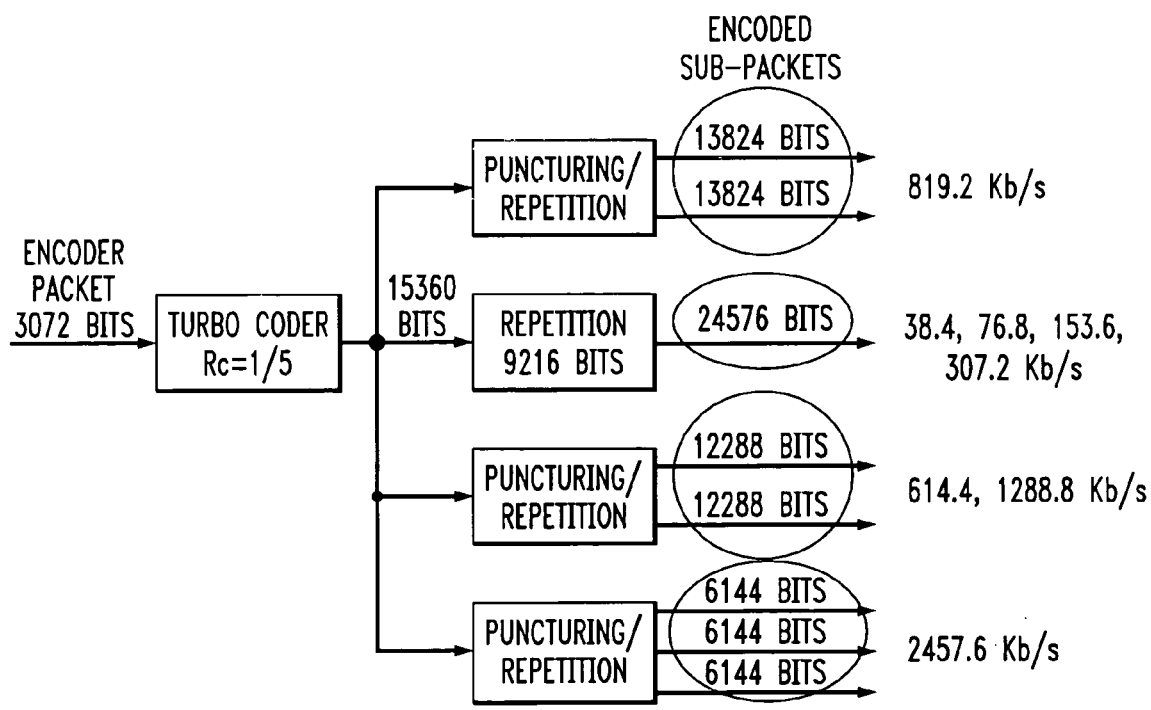
FIG. 3 depicts a flowchart illustrating a manner of varying the size of the sub-packets, the modulation scheme and number of time slots over which the sub-packets are transmitted in accordance with one embodiment of the present invention.

FIG. 3 depicts an example 30 of a sub-packet formation scheme in accordance with this embodiment of the present invention. An encoder packet comprising of 3,072 bits is turbo coded at ⅕ rate into 15,360 bits. Note that, in this example, a same channel coder is used to channel code the encoder packet regardless of the size of the sub-packet. The channel coded encoder packet, i.e., 15,360 bits, then undergoes different puncturing and/or repetition techniques to obtain four different size encoder sub-packets, wherein the original encoder packet may be derived from each of the encoder sub-packets. Specifically, the channel coded encoder packet is punctured and/or repeated to produce two 13,824 bit encoder sub-packets, one 24,576 bit encoder sub-packet, two 12,288 bit encoder sub-packets and/or three 6,144 bit encoder sub-packets. The two 13,824 bit encoder sub-packet may or may not be identical to each other. Likewise for the two 12,288 bit encoder sub-packets and three 6,144 bit encoder sub-packets. Each of the encoder sub-packets may be soft combined with each other.

Note that each of the encoder sub-packets are associated with different data rates. That is, the two 13,824 bit encoder sub-packets are associated with a data rate of 819.2 Kb/s; the 24,576 bit encoder sub-packet is associated with data rates of 38.4 Kb/s, 76.8 Kb/s, 153.6 Kb/s and 307.2 Kb/s; the two 12,288 bit encoder sub-packets are associated with data rates of 614.4 Kb/s and 1288.8 Kb/s; and the three 6,144 bit encoder sub-packets are associated with a data rate of 2457.6 Kb/s. Thus, if the data rate at which the sub-packet was to be transmitted was 153.6 Kb/s, the sub-packet size would be 24,576 bits. Note that there exists a single sub-packet format for a given data rate and encoder packet size. Although FIG. 3 depicts all eight different sub-packets being simultaneously produced, all eight of the encoder sub-packets need not be produced at the same time.

In step 220, an encoder packet size identifier is added to the encoder sub-packet, wherein the encoder packet size identifier indicates the size of the packet from which the encoder sub-packet was derived. Based on the encoder packet size identifier and the transmission data rate, the receiver can determine the format of the sub-packet such that the receiver can correctly soft combine and jointly decode the associated encoder sub-packet with a re-transmission or a prior transmission of an encoder sub-packet derived from the same encoder packet (although the latter sub-packet may be in a different format). Recall that there exists a single sub-packet format for a given data rate and encoder packet size. The data rate is known to receiver based on one of many alternate embodiments discussed above. The transmission data rate is mapped from the rate indication message from the receiver, either based on a mapping that is indicated to the receiver at connection set-up, or on a broadcast channel. Otherwise, the transmission data rate is transmitted in a message or in data header information to the receiver.

In another embodiment, whether or not there exists a single sub-packet format for a given data rate and encoder packet size, an encoder sub-packet format identifier may be added to the encoder sub-packet in lieu of, or in conjunction with, the encoder sub-packet size identifier. The encoder sub-packet format identifier indicating a format of the associated encoder sub-packet such that the receiver knows how to derive or decode the encoder packet from the encoder sub-packet.

In step 225, the encoder sub-packet is modulated and transmitted to the receiver over one or more time slots. The type of modulation scheme used to modulate the encoder sub-packet depends on the new data rate. Table II depicts an example lookup table which may be used in selecting a modulation scheme based on the new data rate. As can be seen, higher modulations (with more bits per symbol) are required to achieve the higher data rates. For example, if the new data rate is 307.2 Kb/s, then the modulation scheme used to transmit the encoder sub-packet would be QPSK.

TABLE II

| New Data Rate | Modulation Scheme |
| --- | --- |
| 9.6 | QPSK |
| 19.2 | QPSK |
| 38.4 | QPSK |
| 76.8 | QPSK |
| 153.6 | QPSK |
| 307.2 | QPSK |
| 614.4 | QPSK |
| 819.2 | 8-PSK |
| 1228.8 | QPSK/16-QAM |
| 1536.0 | 16-QAM |
| 2048.0 | 16-QAM |
| 2457.6 | 16-QAM |
| 3072.2 | 16-QAM |

The number of time slots used in the transmission of the encoder sub-packet depends on the new data rate and the size of the encoder packet (or encoder sub-packet). Table III depicts an example lookup table which may used in determining the number of time slots required for transmitting a particular size encoder packet at the new data rate.

TABLE III

| 7,680 Bit Encoder Packet | | 3,072 Bit Encoder Packet | | 1,536 Bit Encoder Packet | | 768 Bit Encoder Packet | |
| --- | --- | --- | --- | --- | --- | --- | --- |
| Data Rate | Time Slots | Data Rate | Time Slots | Data Rate | Time Slots | Data Rate | Time Slots |
| 38.4 | 160 | 38.4 | 64 | 38.4 | 32 | 38.4 | 16 |
| 76.8 | 80 | 76.8 | 32 | 76.8 | 16 | 76.8 | 8 |
| 153.6 | 40 | 153.6 | 16 | 153.6 | 8 | 153.6 | 4 |
| 307.2 | 20 | 307.2 | 8 | 307.2 | 4 | 307.2 | 2 |
| 614.4 | 10 | 614.4 | 4 | 614.4 | 2 | 614.4 | 1 |
| 877.7 | 7 | 819.2 | 3 | 614.4 | 2 | 614.4 | 1 |
| 1228.8 | 5 | 1228.8 | 2 | 1228.8 | 1 | 614.4 | 1 |
| 1536.0 | 4 | 1228.8 | 2 | 1228.8 | 1 | 614.4 | 1 |
| 2048.0 | 3 | 2457.6 | 1 | 1228.8 | 1 | 614.4 | 1 |
| 3072.0 | 2 | 2457.6 | 1 | 1228.8 | 1 | 614.4 | 1 |
| 3072.0 | 2 | 2457.6 | 1 | 1228.8 | 1 | 614.4 | 1 |
| 3072.0 | 2 | 2457.6 | 1 | 1228.8 | 1 | 614.4 | 1 |

Although the present invention has been described in considerable detail with reference to certain embodiments, other versions are possible. For example, the present invention is also applicable to encoder packets which are not 3,072 bits in size; the encoder sub-packet sizes may vary; the data rate at which particular encoder sub-packets may vary; etc. Therefore, the spirit and scope of the present invention should not be limited to the description of the embodiments contained herein.

We claim:

1. A method of transmitting data comprising the steps of:
channel coding an encoder packet to produce a channel coded encoder packet;
puncturing and/or repeating the channel coded encoder packet to produce a first encoder sub-packet having a first size based on a size of the encoder packet and a first data transmission rate at which the first encoder sub-packet is to be transmitted, wherein the first data transmission rate is different from and based on a data rate for transmitting the first encoder sub-packet indicated in a first rate indication message from a receiver, the puncturing including removing bits from the channel coded encoder packet and the repeating including duplicating bits in the channel coded encoder packet;

transmitting the first encoder sub-packet to a receiver;

receiving a NACK message indicating that the transmission of the first encoder sub-packet was not successfully received at the receiver;

puncturing and/or repeating the channel coded encoder packet to produce a second encoder sub-packet having a second size based on a size of the encoder packet and a second data transmission rate at which the second encoder sub-packet is to be transmitted, the second size being different from the first, but the second encoder sub-packet being representative of the same data as the first encoder sub-packet; and transmitting the second encoder sub-packet to the receiver.

2. The method of claim 1, wherein the first data transmission rate is based on first channel conditions measured at a receiver to which the first encoder sub-packet is intended.

3. The method of claim 1, wherein the first encoder sub-packet has a format which allows the first encoder sub-packet to be soft combined with a second encoder sub-packet derived from the same encoder packet as the first encoder sub-packet.

4. The method of claim 3, wherein the first encoder sub-packet is of a different size than the second encoder sub-packet.

5. The method of claim 3, wherein the first encoder sub-packet is of an identical size than the second encoder sub-packet.

6. The method of claim 1 comprising the additional step of:
adding a first encoder packet size identifier to the first encoder sub-packet indicating the size of the encoder packet from which the first encoder sub-packet was derived.

7. The method of claim 6 comprising the additional step of:
transmitting the first encoder sub-packet with the first encoder packet size identifier at the first data transmission rate.

8. The method of claim 7, wherein the first encoder sub-packet with the first encoder packet size identifier is modulated using a modulation scheme based on the first data transmission rate.

9. The method of claim 7 comprising the additional step of:
prior to the step of transmitting the first encoder sub-packet, transmitting a rate indication message to a receiver to which the first encoder sub-packet is intended indicating the first data transmission rate.

10. The method of claim 1 comprising the additional step of:
adding an encoder sub-packet format identifier to the first encoder sub-packet indicating a first format of the first encoder sub-packet.

11. The method of claim 10, wherein
the first encoder sub-packet is transmitted with the first encoder sub-packet format identifier at the first data transmission rate.

12. The method of claim 11, wherein the first encoder sub-packet with the first encoder sub-packet format identifier is modulated using a modulation scheme based on the first data transmission rate.

13. The method of claim 11 comprising the additional step of:
prior to the step of transmitting the encoder sub-packet, transmitting a first rate indication message to a receiver to which the first encoder sub-packet is intended indicating the first data transmission rate.

14. The method of claim 1 comprising the additional step of:
prior to the step of puncturing and/or repeating the channel coded encoder packet, receiving the first rate indication message from a receiver to which the encoder packet is intended indicating a data rate based on first channel conditions measured at the receiver.

15. The method of claim 14 comprising the additional step of:
transmitting a new rate message to the intended receiver indicating the first data transmission rate.

16. A method of receiving a data transmission comprising the steps of:
receiving at a receiver a message indicating a first data transmission rate;

receiving a first encoder sub-packet with a first encoder packet size identifier indicating a size of the first encoder sub-packet, the first encoder sub-packet being generated by puncturing and/or repeating a channel coded encoder packet, the puncturing including removing bits from the channel coded encoder packet and the repeating including duplicating bits in the channel coded encoder packet;

decoding the first encoder sub-packet using the first encoder packet size identifier and the first data transmission rate, wherein the first data transmission rate is different from and based on a data rate for transmitting the first encoder sub-packet indicated in a first rate indication message from a receiver;

transmitting a negative acknowledgement message and a rate indication message if the first encoder sub-packet cannot be successfully decoded, the rate indication message indicating current channel conditions at the receiver;

receiving a message indicating a second data transmission rate;

receiving a second encoder sub-packet with a second encoder packet size identifier indicating a size of the second encoder sub-packet, the size of the second encoder sub-packet being different from the first, but the second encoder sub-packet being representative of the same data as the first encoder sub-packet; and decoding the second encoder sub-packet using the second data transmission rate, the second encoder packet size identifier and the first encoder sub-packet.

17. A method of receiving a data transmission comprising the steps of:
receiving at a receiver a message indicating a first data transmission rate;

receiving a first encoder sub-packet with a first encoder sub-packet format identifier indicating a format of the first encoder sub-packet, the first encoder sub-packet being generated by puncturing and/or repeating a channel coded encoder packet, the puncturing including removing bits from the channel coded encoder packet and the repeating including duplicating bits in the channel coded encoder packet;

decoding the first encoder sub-packet using the first encoder sub-packet format identifier and the first data transmission rate, wherein the first data transmission rate is different from and based on a data rate for transmitting the first encoder sub-packet indicated in a first rate indication message from a receiver;

transmitting a negative acknowledgement message and a rate indication message if the first encoder sub-packet can not be successfully decoded, the rate indication message indicating current channel conditions at the receiver;

receiving a message indicating a second data transmission rate;

receiving a second encoder sub-packet with a second encoder sub-packet format identifier encoder sub-packet indicating a format of the second encoder sub-packet, a size of the second encoder sub-packet being different from a size of the first encoder sub-packet, but the second encoder sub-packet being representative of the same data as the first encoder sub-packet; and decoding the second encoder sub-packet using the second data transmission rate, the second encoder sub-packet format identifier and the first encoder sub-packet.

18. A method of transmitting data comprising the steps of:

channel coding an encoder packet to produce a channel coded encoder packet;

puncturing and/or repeating the channel coded encoder packet to produce a first encoder sub-packet having a first size based on a size of the encoder packet and a first data transmission rate at which the first encoder sub-packet is to be transmitted and including a first encoder packet size identifier to the first encoder sub-packet indicating the size of the encoder packet from which the first encoder sub-packet was derived, wherein the first data transmission rate is different from and based on a data rate for transmitting the first encoder sub-packet indicated in a first rate indication message from a receiver, the puncturing including removing bits from the channel coded encoder packet and the repeating including duplicating bits in the channel coded encoder packet;

transmitting the first encoder sub-packet to a receiver;

receiving a NACK message indicating that the transmission of the first encoder sub-packet was not successfully received at the receiver;

puncturing and/or repeating the channel coded encoder packet to produce a second encoder sub-packet having a second size based on a size of the encoder packet and a second data transmission rate at which the second encoder sub-packet is to be transmitted, the second size being different from the first, but the second encoder sub-packet being representative of the same data as the first encoder sub-packet; and transmitting the second encoder sub-packet to the receiver.

* * * * *